Feb. 9, 1960

C. H. JOHNSON 2,924,127

INDEXING APPARATUS

Original Filed Sept. 15, 1955

Charles H. Johnson
INVENTOR.

BY *Andrus & Scealer*

ATTORNEYS.

Feb. 9, 1960 C. H. JOHNSON 2,924,127
INDEXING APPARATUS
Original Filed Sept. 15, 1955 6 Sheets-Sheet 2

Charles H. Johnson
INVENTOR.
BY
ATTORNEYS.

Feb. 9, 1960    C. H. JOHNSON    2,924,127
INDEXING APPARATUS

Original Filed Sept. 15, 1955    6 Sheets-Sheet 3

Charles H. Johnson
INVENTOR.

BY *Andrus & Scales*
ATTORNEYS.

Feb. 9, 1960

C. H. JOHNSON 2,924,127

INDEXING APPARATUS

Original Filed Sept. 15, 1955

Charles H. Johnson
INVENTOR.

BY *Andrus & Sceales*
ATTORNEYS.

United States Patent Office 2,924,127
Patented Feb. 9, 1960

2,924,127

INDEXING APPARATUS

Charles H. Johnson, Madison, Wis., assignor to Gisholt Machine Company, Madison, Wis., a corporation of Wisconsin Continuation of abandoned application Serial No. 534,419, September 15, 1955. This application December 31, 1958, Serial No. 785,549

7 Claims. (Cl. 74—822)

This invention relates to an indexing apparatus, and more particularly to an indexing apparatus for a rotary element, such as a drum.

The apparatus of the invention contemplates indexing of a multi-faced element from face to face successively, with a re-index feature which reverses the direction of rotation of the element to directly return to the initial face from any of a plurality of faces. An hydraulic system is provided which indexes and re-indexes the element, as well as controlling locking and unlocking of the element.

The apparatus is particularly adaptable for use in a machine tool wherein it is desired to index a drum carrying a plurality of tracer templates or cams.

This application is a continuation of the inventor's copending application Serial No. 534,419, filed September 15, 1955, now abandoned.

The best mode presently contemplated for carrying out the invention is illustrated in the accompanying drawings in which.

Figure 1:
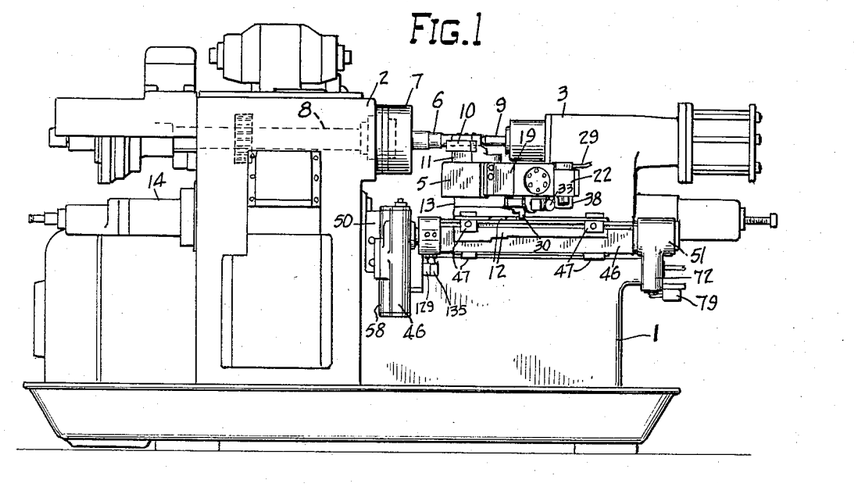
Figure 1 is a front elevation of a lathe embodying the invention.
Figure 2:
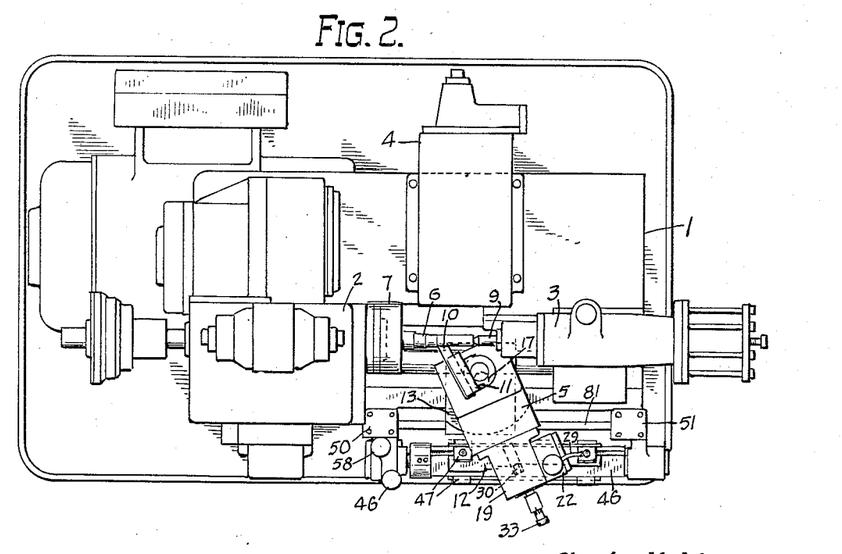
Figure 2 is a top plan view of the lathe of Fig. 1.

The lathe illustrated comprises a bed 1, a headstock 2, a tailstock 3, a rear slide 4 and a tracer slide 5.

The workpiece 6 to be machined may be secured in a chuck 7 on the end of the spindle 8 in headstock 2 and may be additionally supported by the axially movable center 9 of tailstock 3.

The rear slide 4 may or may not be used depending upon need for facing of the workpiece or of additional cuts.

The tracer slide 5 carries a machining tool 10 which may be clamped to a suitable tool post 11 on the slide and which is adapted to machine the workpiece 6 in successive cuts under the control of a separate tracer cam 12 for each cut.

A carriage 13 is adapted to be moved longitudinally upon ways on bed 1 by any suitable means such as the hydraulic cylinder 14 and piston 15, one of which is secured to the bed and the other to the carriage.

A swivel base 16 is pivoted upon the carriage 13 and adjustable horizontally on the pivot post 17 to any suitable angle.

Figure 3:
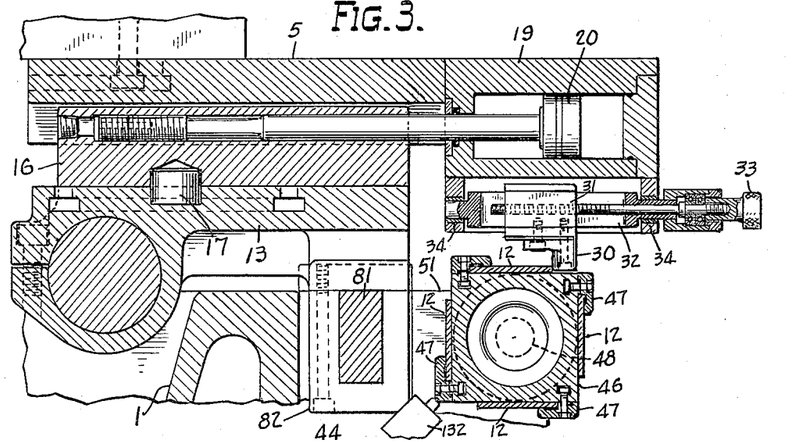
Figure 3 is a vertical longitudinal central section of the tracer slide with adjacent parts of the carriage support therefor and with the slide in the position immediately at the end of a cutting operation and before back traverse.

The tracer slide 5 is mounted on suitable ways on base 16 to be moved parallel thereto and generally at a substantial angle to the direction of movement of the carriage 13. A hydraulic cylinder 19 is secured to the rear end of slide 5 parallel to its direction of movement and a piston 20 therein is secured to base 16.

Cylinder 19 is actuated by means of a jet valve 21 as set forth in the copending application of the present inventor, Serial No. 348,302, filed April 13, 1953, now abandoned in favor of a continuation application S.N. 657,764, filed May 8, 1957.

Figure 4:
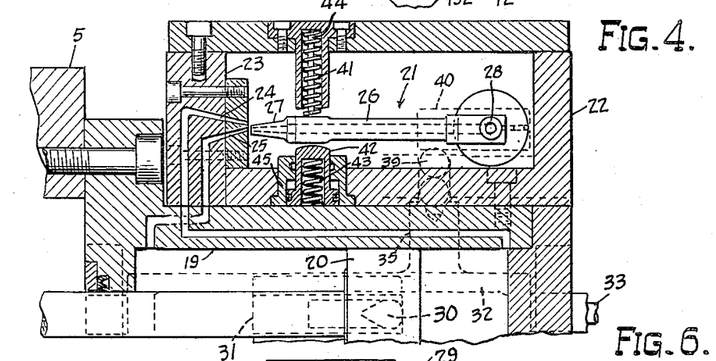
Fig. 4 is an enlarged horizontal section showing the jet chamber and a portion of the slide cylinder of Fig. 3.

For this purpose a jet reservoir or housing 22 is provided adjacent to cylinder 19 and secured thereto. The reservoir has a port block 23 in the inner end with two adjacent ports 24 and 25, connected by suitable corresponding passages to the opposite ends of the cylinder 19. A jet tube 26 has its discharge jet nozzle 27 facing the port block 23.

Jet tube 26 is mounted for horizontal pivoting on a vertical tubular pivot member 28 mounted in housing 22 and which is connected at the top by conduit 29 to a source of pressure liquid to supply nozzle 27 with a constant discharge flow of liquid.

The jet tube 26 is pivotally actuated to effect selective pressure changes in the ports 24 and 25 and the corresponding ends of cylinder 19, by the tracer cam 12.

For this purpose each tracer cam 12 is disposed during operation to face in the same direction of facing as the work surface of the workpiece 6 to be machined.

Figure 5:
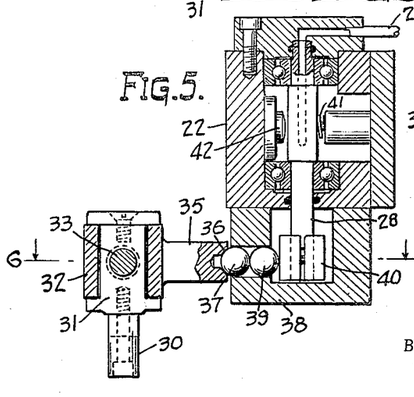
Fig. 5 is an enlarged detail view of the mechanism for actuating the jet valve from the tracer finger, with parts in section.

A follower or finger 30 depends from a slide block 31 mounted in a carrier 32 shown as being beneath cylinder 19. A micrometer adjustment 33 is provided for block 31 to position finger 30 accurately relative to the carrier 32.

The carrier 32 is mounted in suitable end bearings 34 depending from cylinder 19 to provide for free rotation of the carrier and also longitudinal movement of the same.

Figure 6:
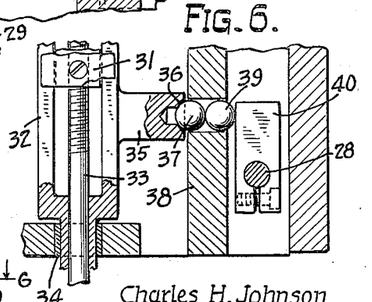
Fig. 6 is a detail section taken horizontally on line 6—6 of Fig. 5 with parts shown in plan.

A cone arm 35 is secured to carrier 32 and extends laterally therefrom toward jet housing 22. The outer end of arm 35 has a conical recess 36 therein for receiving and confining a ball 37 disposed in an opening in a ball block 38 depending from housing 22.

Ball 37 presses against a second ball 39 in block 38 and which in turn presses against a lever arm 40 clamped to the lower end of pivot tube 28.

The cone arm 35 and the balls 37 and 39 are normally in alignment when jet nozzles 27 directs its discharge to port 25 in block 23, so that the tracer slide moves in at full speed.

In the event that carrier 32 is turned in its bearings 34 or is moved axially therein by finger 30 engaging and following the acting surface of tracer cam 12, the conical recess 36 will move the ball 37 inwardly against ball 39 and the latter will push lever 40 in a direction turning tube 28 to direct jet nozzle 27 toward port 24 which feeds pressure liquid to the outer end of cylinder 19 and tends to withdraw the tool 10 outwardly of the workpiece 6.

A spring 41 in jet housing 22 biases jet tube 26 in a direction to cause jet nozzle 27 to direct pressure liquid into port 25 and supply liquid to the inner end of cylinder 19, thereby feeding the tool 10 inwardly of the workpiece 6. Spring 41 effects a constant following of tracer cam 12 by the finger 30.

When finger 30 is following a portion of the cam surface of tracer cam 12 that is parallel to the axis of workpiece 6 as carriage 13 is moved on bed 1 the jet nozzle will be held neutral to avoid feeding movement of tool 10 either in or out of the workpiece.

When tracer cam 12 changes abruptly to let finger 30 move inwardly, the jet nozzle 27 under the force of spring 41 is moved to effect a corresponding inward movement of slide 5 and tool 10 under a servo control which stops the feeding of the tool as soon as finger 30 stops moving in.

When tracer cam 12 has a shoulder that makes finger 30 move outwardly the jet tube is moved against the force of spring 41, and the jet nozzle effects a corresponding outward movement of slide 5.

The back traverse of slide 5 is effected at the completion of a cut by a back traverse plunger 42 in housing 22 and which is biased by spring 43 to normally engage jet tube 26 and force the same pivotally against spring 41 and to a position where the jet from nozzle 27 enters port 24 and causes a rapid retraction of the slide. A pin 44 extending axially of spring 41 determines the back traverse position for jet tube 26.

During a cutting cycle pressure liquid is maintained in the cylinder 45 of plunger 42 to retract the same against its spring 43 and free jet tube 26 for servo action under the influence of spring 41.

According to the present invention, a plurality of tracer cams 12 are employed corresponding to the several cuts to be taken in the workpiece. The cams 12 are mounted on corresponding faces of a drum 46 to be indexed for actuation of finger 30 in successive cutting cycles.

Figure 7:
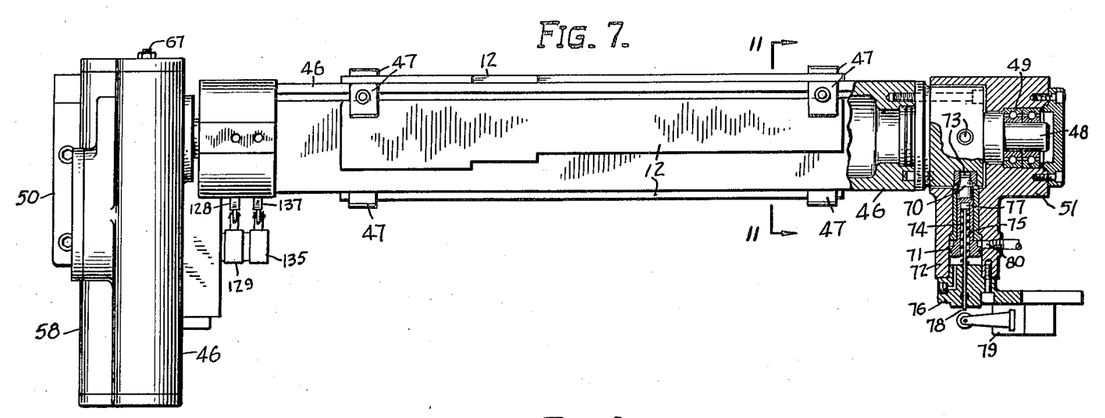
Fig. 7 is an enlarged front elevation of the tracer cam drum with parts in section.
Figures 10, 11:
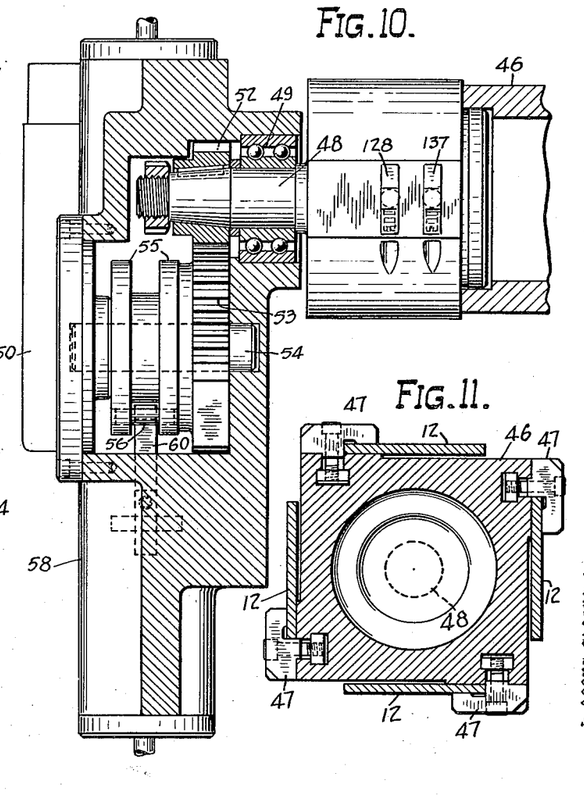
Fig. 10 is a detail sectional view taken on line 10—10 of Fig. 9.
Fig. 11 is a section taken on line 11—11 of Fig. 7 showing the clamping of the tracer cams or templates on the drum.

The drum 46 illustrated has four faces each having a tracer cam 12 secured in place thereon by suitable T-slot clamps 47. The drum 46 has end trunnions 48 journaled in suitable frictionless bearings 49 in end brackets 50 and 51 secured to bed 1.

Figure 9:
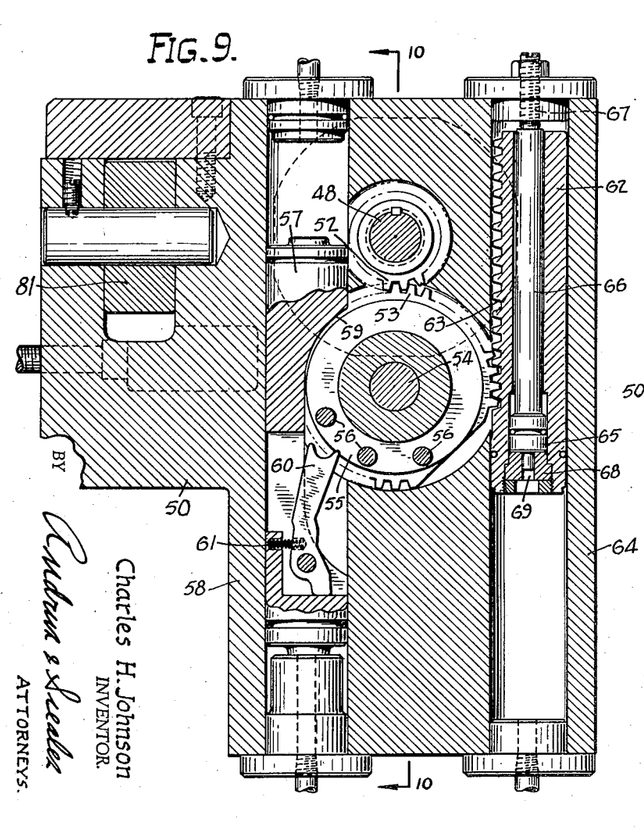
Fig. 9 is a section taken on line 9—9 of Fig. 8 showing the cylinders for indexing the drum.
Figure 12:
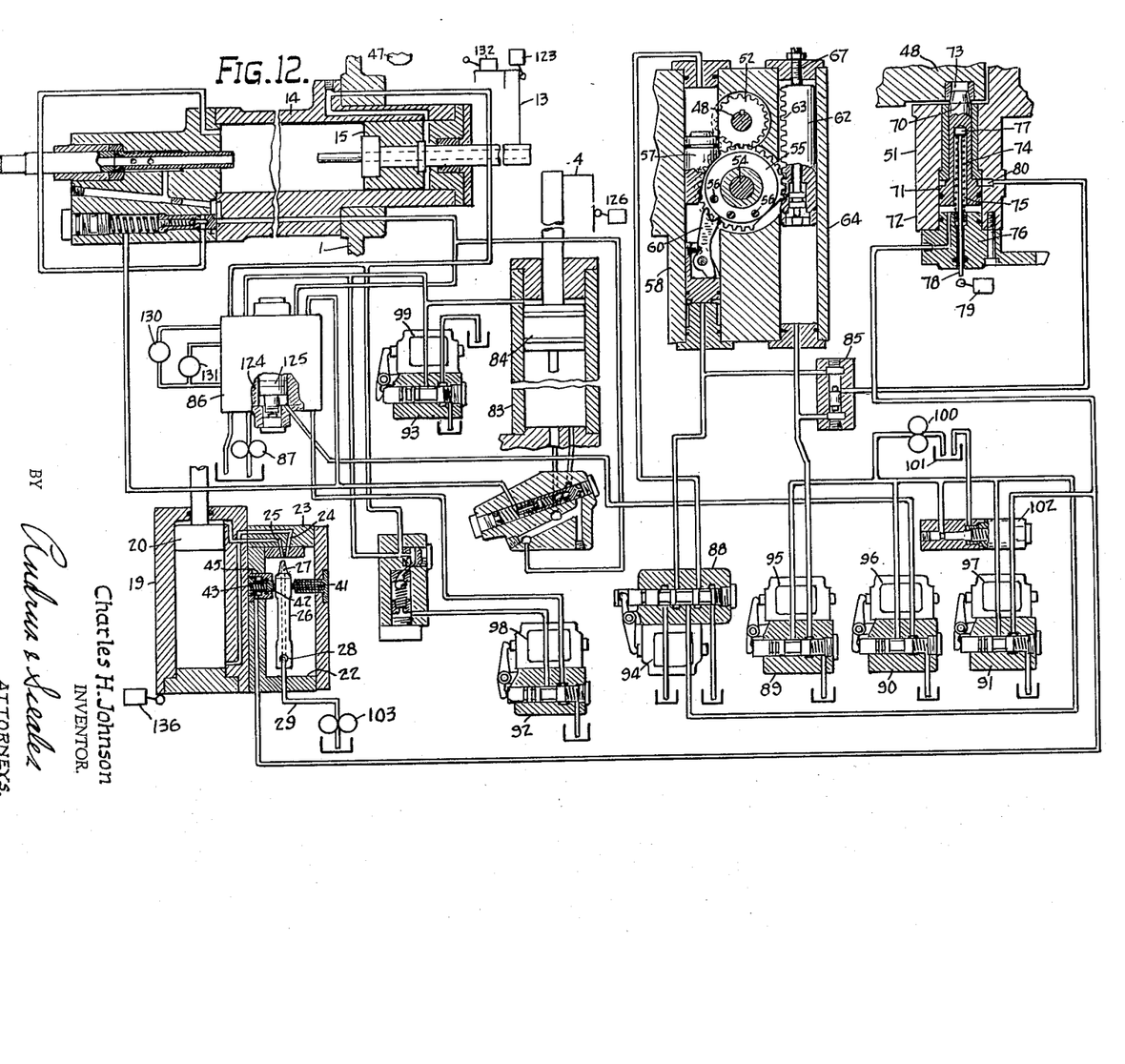
Fig. 12 is a diagram of the hydraulic power and control circuits.

As best shown in Figs. 9, 10, and 12, bracket 50 contains the mechanism for indexing the drum 46. For this purpose the trunnion 48 supported by bracket 50 has a gear 52 keyed thereon and meshing with a drive gear 53 rotatably mounted on shaft or pin 54 in the bracket.

The hub of gear 53 carries a pair of spaced flanges 55 between which a plurality of circumferentially spaced pins 56 are carried. In the construction illustrated there are three useable pins 56, one less than the number of faces and tracer cams on drum 46.

A piston 57 is disposed in a vertical cylinder 58 at one side of gear 53, the piston having a recess 59 facing the gear and receiving a portion of the flanges 55.

Piston 57 carries a pivoted pawl 60 which is biased to operative position by a spring 61 and which has a recessed upper end disposed to receive a pin 56 as piston 57 moves upwardly to rotate gear 53 through one-eighth of a revolution and index the drum 46 a quarter of a revolution. For this purpose gear 53 has twice the circumference of gear 52 so that gear 53 only needs to turn about one-half a revolution to effect a full indexing of all four faces of drum 46.

As piston 57 drops from an indexing stroke the pawl 60 pivots against spring 61 and rides free of the next pin 56 until it clears the latter.

The piston makes an operative indexing movement for each of the faces of drum 46 after the first face.

After the cutting cycle for the last face of drum 46, the drum is returned to the first face by back rotation of the drum. For this purpose a piston 62 is disposed on the opposite side of gear 53 from piston 57 and has a rack 63 meshing with the gear and of a length approximately one-half the circumference of the gear.

The piston 62 operates in a cylinder 64 in bracket 50 disposed generally parallel to cylinder 58.

As gear 53 indexes one-eighth of a revolution for each index movement of drum 46 it moves rack 63 and piston 62 downwardly in cylinder 64 until the piston almost reaches the lower end of its stroke at the indexing of the last face of drum 46. Thereafter, and following the final cut, pressure fluid is admitted to the lower end of cylinder 64 to lift piston 62 and effect a return drive for gear 53 by means of rack 63 and which returns drum 46 to present the first face and its tracer cam 12 on top for operative engagement with finger 30.

The piston 62 is cushioned at the end of its upward stroke by an inner piston 65 having a rod 66 extending axially upwardly of piston 62 to engage an adjustable stop 67 in the upper end of cylinder 64. The lower end of piston 62 has a plug 68 with a central bleeder opening therein for receiving the pilot 69 on piston 65 so that when fluid is admitted to the lower end of cylinder 64 it also raises piston 65 so that rod 66 engages stop 67 before piston 62 reaches the upper end of its stroke. Thereafter, as piston 62 moves upwardly it has to slowly displace the fluid contained between piston 65 and plug 68 through the bleeder opening around the pilot 69. Cushioning of piston 62 permits use of higher pressures in cylinder 64 and thus faster re-indexing.

As best shown in Figs. 7 and 12, the drum 46 is positively locked in indexed position by means of the locking pin 70 in bracket 51. For this purpose pin 70 has a lower head 71 constituting a piston in the vertical cylinder 72. The upper end of pin 70 is conical to enter one of a plurality of circumferentially spaced complementary conical recesses 73 in the right hand trunnion 48 of drum 46.

The pin 70 is normally raised and held in locking position with its upper end seated in recess 73 by means of oil pressure and of a coil spring 74 contained in an axial bore 75 in the lower end of the pin, spring 74 being supported by plug 76 constituting the lower end of cylinder 72.

The upper end of spring 74 presses against head 77 of a pin 78 disposed axially of the spring and which head engages the upper end of the bore 75 to support lockpin 70. The pin 78 extends downwardly through plug 76 to engage and actuate a limit switch 79 when locking pin 70 is retracted from recess 73.

Retraction of locking pin 70 is accomplished by admitting pressure fluid through passage 80 to the space in cylinder 72 above head 71 to force the head downwardly until it engages plug 76 as a stop.

Figure 8:
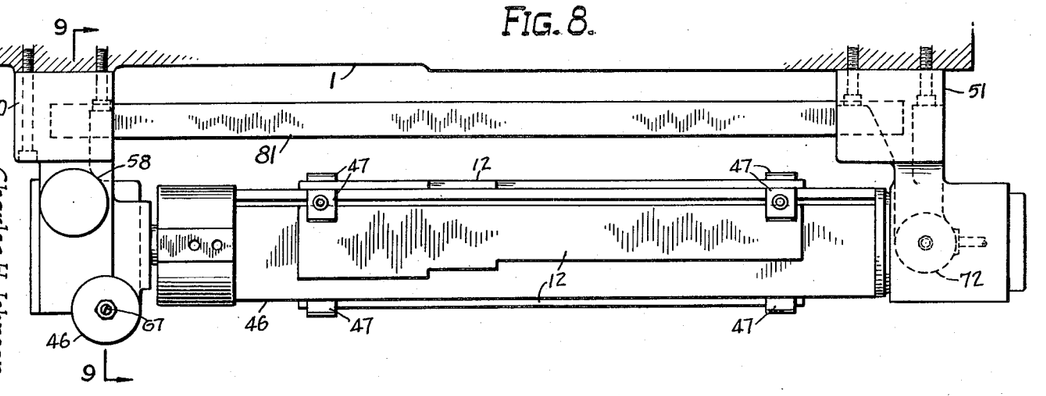
Fig. 8 is a top plan view of the cam drum and its support.

The brackets 50 and 51 carry a bar 81 for preventing carriage 13 from rising during its travel longitudinally of the bed. For this purpose a U-shaped block 82 is bolted to the bottom of carriage 13 and encircles the underside of bar 81 so that tracer finger 30 cannot lift away from the operative tracer cam 12.

The drum 46 may have various trip dogs adjustably located thereon for engaging limit switches disposed adjacent the drum for controlling the several cycles of cut for the lathe, as hereinafter described.

Figure 13:
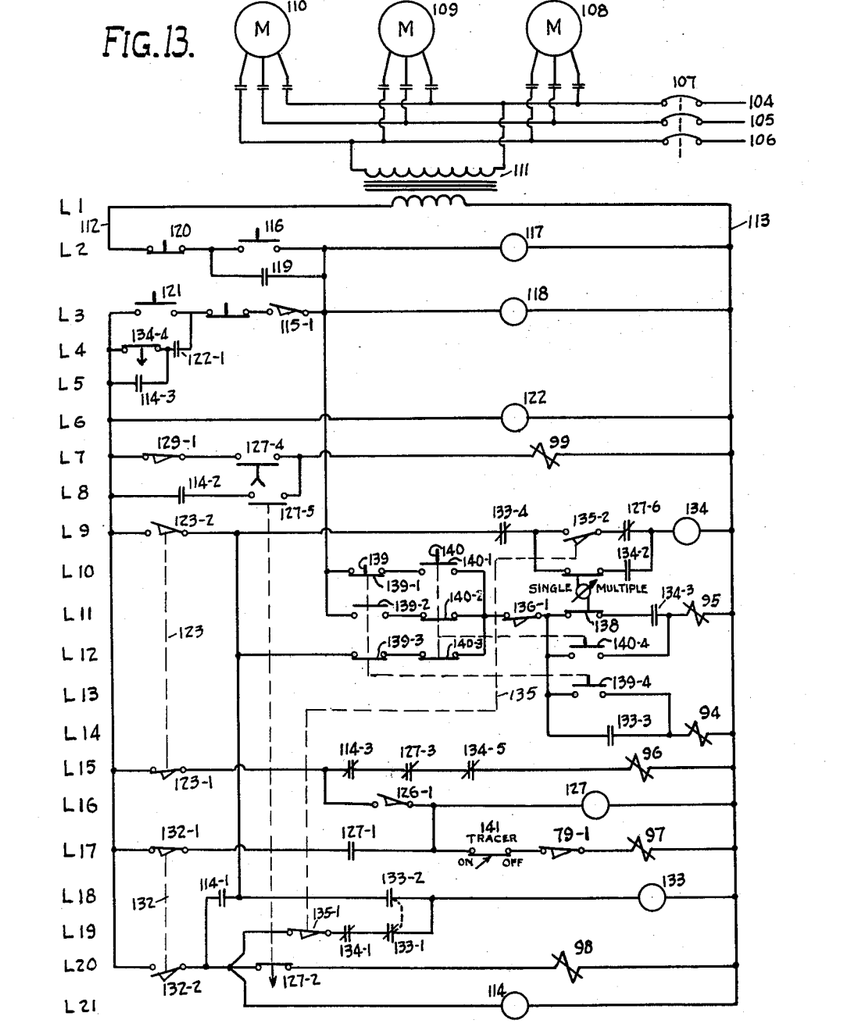
Fig. 13 is a diagram of the electrical circuit with refinements such as manual controls omitted.

The hydraulic diagram of Fig. 12 and the electrical diagram of Fig. 13 are illustrative of a general cycle control possible for the machine, it being understood that various cycle sequences and controls may be employed.

In the hydraulic diagram of Fig. 12 the carriage cylinder 14 and piston 15 and a cylinder 83 and piston 84 for the rear slide 4 are actuated through a main control valve 86 from the large vane pump 87 and the two feed pumps to be described hereinafter. The several solenoid control valves 88, 89, 90, 91, 92 and 93 are actuated by solenoid coils 94, 95, 96, 97, 98 and 99, respectively, as shown in Fig. 12. A pump 100 serves to supply pressure fluid to valves 88, 89, 90 and 91 from sump 101, and a pressure relief valve 102 returns excess power liquid to the sump.

A pump 103 supplies power liquid from a separate sump through conduit 29 to the tracer jet 27 to actuate cylinder 19 and piston 20 and traverse and feed tracer slide 5.

The actuation of the hydraulic control circuits will be described more fully in connection with a description of the machine cycle.

In the diagram of Fig. 13, the three phase power supply lines 104, 105 and 106 are connected by a suitable circuit breaker 107 and through separate contactors to the several motors, shown as the spindle drive motor 108, the traverse motor 109 and the hydraulic motor 110.

The power lines 104 and 106 also feed the primary of a single phase transformer 111 for supplying current to the control circuit. For this purpose the secondary of transformer 111 delivers current to two vertical lead lines 112 and 113, and the various control relays, solenoids and switches are connected in transverse lines extending generally between the leads 112 and 113. For convenience the several transverse lines are numbered successively at the left hand side of Fig. 13, beginning with line L1 containing the secondary of transformer 111 and ending with line L21 containing relay 114.

When the workpiece 6 has been secured in chuck 7 on spindle 8 and the center 9 of tailstock 3 has been moved to engage the end of the workpiece, the tailstock also engages a limit switch to close its contacts 115–1 in line L3, and the cycle is ready.

When the "machine start" button 116 in line L2 is pressed the starter 117 in line L2 for spindle motor 108 is energized, thereby starting the spindle 8. At the same time the starter 118 in line L3 for the traverse motor 109 is energized to drive pumps 87 and 100. The starter 118 also closes the holding contacts 119 which by-pass the start button 116 in line L2 and keeps the machine in operation until the stop button 120 in line L2 is pressed open to drop out the holding circuit and disconnect all controls.

When the "cycle start" button 121 in line L3 is pressed, switch 115 being closed, the starter 122 in line L6 for hydraulic motor 110 is energized and the motor starts pump 103 to supply power liquid to jet nozzle 27. Starter 122 closes its contacts 122–1 in line L4 to complete a holding circuit around start button 121.

At the same time the forward traverse solenoid 96 in line L15 is energized through the then closed limit switch 123–1 and normally closed contacts to be referred to later.

Energization of solenoid 96 actuates the three way valve 90 to port pressure fluid from pump 100 to a cylinder 124 in main control valve 86 and which pushes the spool 125 of that valve to forward traverse position where power liquid from pump 87 is ported to the piston rod end of rear slide cylinder 83. Spool 125 remains in forward traverse until the rear slide 4 releases limit switch 126 and closes its contacts 126–1 in line L16 to energize time delay relay 127 in line L16. Energization of relay 127 closes its holding contacts 127–1 in line L17 so that when carriage 13 moves off from limit switch 123 and opens its contacts 123–1 in line L15, the relay continues to be energized.

Energization of relay 127 immediately opens its contacts 127–2 in line L20 so that the solenoid 98 remains de-energized. Energization of relay 127 opens its contacts 127–3 in line L15 to de-energize solenoid 96 and permits the stopping of the forward traverse of rear slide 4 by shifting of spool 125 to feed position.

After a predetermined time following energization of relay 127, its contacts 127–4 in line L7 close, thereby energizing solenoid 99 and actuating valve 93 to drain feed oil going to rear slide cylinder 83 to thereby block any feed of the rear slide. If it is desired to feed the rear slide, a dog 128 is located on the drum 46 at a position where it will engage a limit switch 129 on bracket 50, whereupon the limit switch contacts 129–1 in line L7 open and the solenoid 99 is prevented from energizing and from establishing the feed block. The power liquid utilized for forward and back traverse of rear slide 4 is supplied through the main control valve 86 from pump 87. The power liquid utilized for forward feed of the rear slide 4 is supplied through the main control valve 86 from a feed pump 130 driven by spindle 8.

The power liquid utilized for forward feed of carriage 13 is supplied through the main control valve 86 from a feed pump 131 driven by spindle 8. The power liquid utilized for back traverse of carriage 13 is supplied through the main control valve 86 from the pump 87.

Upon shifting of spool 125 from forward traverse to feed position power liquid going from pump 130 to cylinder 83 is sent to drain when solenoid 99 is energized to actuate blocking valve 93. Also upon shift of spool 125 from forward traverse to feed position power liquid is admitted from pump 131 to cylinder 14 to feed the carriage 13 longitudinally.

When carriage 13 moves forwardly it releases limit switch 123, thereby opening the contacts 123–1 in line L15 and closing the contacts 123–2 in line L9. Opening of contacts 123–1 gives the control of further energization of relay 127 to limit switch 132 the contacts 132–1 of which in line L17 are normally closed. Closing of contacts 123–2 in line L9 readies the index circuits for drum 46.

At the same time as relay 127 is energized, solenoid 97 in line L17 is energized to actuate valve 91 and which thereupon admits pressure fluid to cylinder 45 and pushes plunger 42 away from jet tube 26 to allow pivoting of the latter to a position where jet nozzle 27 directs power fluid into port 25 and effects a forward traverse of slide 5. When finger 30 engages tracer cam 12 it pivots jet tube 26 against spring 41 and thereafter controls the position of the tool 10 in accordance with the pattern of the tracer cam or template.

When carriage 13 reaches the end of the cut, a limit switch 132 on member 82 of the carriage engages one of the dogs 47 on the drum 46 to open its contacts 132–1 in line L17 and to close its contacts 132–2 in line L20. For this purpose one of the clamps 47 for each template 12 has an extended corner to constitute a dog, and this particular clamp is located at the position for tripping limit switch 132 at the end of the cut for the given template.

Opening of contacts 132–1 in line L17 de-energizes tracer solenoid 97 thereby releasing the pressure from cylinder 45 and permitting spring 43 to bias plunger 42 against jet tube 26 to move the latter to a back traverse position where the nozzle 27 directs power liquid into port 24 and drives piston 20 in the reverse direction in cylinder 19.

Opening of contacts 132–1 in line L17 also de-energizes relay 127 which thereupon drops out its holding contacts 127–1 and closes contacts 127–3 in line L15 to ready the circuit for the forward traverse solenoid 96 for the next cycle.

Upon de-energization of relay 127 its contacts 127–2 in line L20 delay in closing to permit retraction of tracer slide 5 and indexing of drum 46 and then close to energize solenoid 98 which actuates valve 92 and trips the spool 125 in the main control valve 86 to back traverse position where all pressure fluid from pumps 130 and 131 is sent to drain and pressure fluid from pump 87 is supplied to the appropriate ends of cylinders 14 and 83 to effect a back traverse of carriage 13 and of rear slide 4.

Closing of contacts 132–2 in line L20 by actuation of limit switch 132, as previously described, energizes relay 114 in line L21 which in turn closes its holding contacts 114–1 in line L18 so that it continues to be energized through closed contacts 123–2 in line L9 after carriage 13 starts to back traverse and releases limit switch 132 opening contacts 132–2.

Energization of relay 114 also closes contacts 114–2 in line L8 and which by-pass contacts 127–4 and limit switch contacts 129–1 so that the rear slide remains blocked until the time delay contacts 127–2 in line L20 close to trip valve 86 to back traverse as previously described. For this purpose the dash pot for contacts 127–2 also actuate a second set of contacts 127–5 in line L8 which opens when contacts 127–2 close, to thereby de-energize solenoid 99 and release the feed block for cylinder 83.

Energization of relay 114 in line L21 also opens its normally closed contacts 114–3 in line L15 to prevent any possible energization of the forward traverse solenoid 96 while relay 114 is in control.

Closing of contacts 132–2 in line L20, as previously described, also closes the circuit for relay 133 in line L18 through the normally closed relay contacts 133–1 and 134–1 and the limit switch contacts 135–1 in line L19.

Upon energization of relay 133 its holding contacts 133–2 in line L18 close followed by opening of contacts 133–1 in line L19. Thereafter, energization of relay 133 and also of relay 114 continues until limit switch 123 is engaged by carriage 13 and its contacts 123–2 in line L9 are opened.

Energization of relay 133 closes its contacts 133–3 in line L14 to energize index solenoid 94 through the closed contacts 136–1 of limit switch 136 in line L11 and the closed contacts 123–2 in line L9. Limit switch contacts 136–1 in line L11 are held closed only when tracer slide 5 is in fully retracted position so that indexing and reindexing can only take place when tool 10 is clear of the workpiece.

Energization of solenoid 94 actuates valve 88 to admit fluid from pump 100 to the lower end of cylinder 58 to lift piston 57 and cause pawl 60 to engage a pin 56 and rotate drum 46 one quarter of a turn to present the next template or tracer cam 12 on top for controlling slide 5.

Actuation of valve 88 also admits pressure fluid from pump 100 through a float valve 85 to cylinder 72 to effect a withdrawal of lock pin 70 downwardly against its spring 74 in which piston pin 78 engages the limit switch 79 and opens its contacts 79–1 in line L17 to block any action of the tracer.

When carriage 13 back traverses to the point where it engages limit switch 123 the contacts 123–2 in line L9 will open and thereby de-energize both relays 114 and 133. This opens contacts 133–3 in line L14 and de-energizes solenoid 94 thereby returning valve 88 to normal and dropping piston 57 in cylinder 58 ready for the next index movement. At the same time valve 88 releases pressure from cylinder 72 and spring 74 forces lock pin 70 into place. Limit switch 79 closes its contacts 79–1 in line L17.

Contacts 123–1 in line L15 are closed by actuation of limit switch 123 and thereupon start another forward cycle of operation which follows the above description.

When the drum 46 is indexed to present the last template or tracer cam 12 for control of the tool 10, a dog 137 on the drum engages and actuates the limit switch 135 on bracket 50 and thereby opens contacts 135–1 in line L19 and closes contacts 135–2 in line L9.

Thereafter, following the last cut, when the limit switch 132 on carriage 13 engages the dog 47 and closes contacts 132–2 in line L20 the relay 133 is prevented from energizing due to the open contacts 135–1. Instead, relay 134 in line L9 becomes energized as soon as relay 127 is de-energized by opening of contacts 132–1 in line L17. For this purpose limit switch contacts 123–2 in line L9 are closed by the carriage 13 being removed from limit switch 123, and contacts 133–4 and 127–6 in line L9 are normally closed.

Energization of relay 134 in line L9 closes the holding contacts 134–2 in line L10 which by-pass contacts 135–2 and 127–6 in line L9.

Energization of relay 134 also closes contacts 134–3 in line L11 to set up the circuit for re-index solenoid 95.

The single and multiple pass control switch 138 between lines L10 and L11 provides a manual means for eliminating all automatic indexing of the drum 46, as where only a single template 12 is used, and for providing automatic indexing of the drum in any grouping desired as where more than one template is used.

The location of the dog 137 on drum 46 will determine the number of templates used prior to re-index of the drum.

With switch 138 in the multiple pass position, as shown, and contacts 134–3 in line L11 closed, when tracer slide 5 back traverses to clear tool 10 from the work and engages limit switch 136 and closes its contacts 136–1 in line L11 the re-index solenoid 95 will be energized.

Energization of re-index solenoid 95 actuates valve 89 to supply power fluid from pump 100 to the bottom end of cylinder 64 to lift piston 62 and reverse rotate drum 46 to starting position from any of the other indexed positions. The inefficient forward index from face to face to return to the initial position is not utilized. At the same time valve 89 supplies pressure liquid through float valve 85 to cylinder 72 to withdraw lock bolt 70, as previously described.

Energization of relay 134 also snaps open contacts 134–4 in line L4 to place relay 114 in control by its contacts 114–3 in line L5 and which are closed upon energization of the relay following closing of limit switch contacts 132–2 in line L20.

Energization of relay 134 also opens its contacts 134–5 in line L15 as an added precaution against energization of forward traverse solenoid 96 during re-indexing.

When carriage 13 completes its back traverse and actuates limit switch 123 to open its contacts 123–2 in line L9, relay 134 will be de-energized thereby opening contacts 134–3 and de-energizing solenoid 95. Valve 89 will then return to normal position wherein the lower end of cylinder 64 is connected to drain and lockbolt 70 is permitted to seat.

Opening of contacts 123–2 in line L9 also de-energizes relay 114 and opens contacts 114–3 and de-energizes starter 122 to open its contacts 122–1 before the time delay closing of contacts 134–4 in line L4 to return the circuit to the position shown in Fig. 13 except for contacts 119 being closed to ready the circuit for the next workpiece.

Suitable clutch and brake apparatus may be provided for the spindle and different spindle speeds may be provided under the control of drum 46, if desired.

Where it is desired to employ different cutting tools 10 for the rough cuts and the finishing cut or cuts, an indexing tool post may be provided on slide 5 to carry both tools, and additional means should be provided to index the tools in sequence with the several cutting operations, as shown in applicant's copending application, Serial No. 539,642, filed October 10, 1955, now abandoned.

Where, for set up purposes, it is desired to provide manual control of indexing and re-indexing of drum 46, the index push button 139 having contacts 139–1 in line L10, contacts 139–2 in line L11, contacts 139–3 in line L12 and contacts 139–4 in line L13 serve to energize the index solenoid 94, and the re-index push button 140 having contacts 140–1 in line L10, contacts 140–2 in line L11, contacts 140–3 in line L12 and contacts 140–4 in line L12 serve to energize the re-index solenoid 95.

Contacts 139–1 and 140–2 are interlocks to prevent simultaneous energization of solenoids 94 and 95. Contacts 139–2 and contacts 140–1 serve to connect the corresponding solenoids 94 and 95 to line L2. Contacts 139–3 and 140–3 serve to disconnect line L9 so that no current is fed into the relay circuits when either button 139 or 140 is pressed. Contacts 139-4 by-pass the normally open relay contacts 133-3 in line L14, and contacts 140-4 by-pass the normally open relay contacts 134-3 in line L11.

Manual control and release of the tracer slide is provided by the tracer selector switch 141 in line L17.

The single and multiple pass switch 138 and the manual index button 139 and re-index button 140 provide means for selecting any tracer template or templates where desired. Also by this means the automatic cycle may include one, two, three or four passes. Where less than four passes are used the remaining drum faces can be set up with templates for other workpieces.

The invention provides a novel indexing apparatus which is versatile and fast operating, and which may be hydraulically controlled in sequential manner by operation of a machine to which the apparatus is attached. Re-indexing to starting position is direct.

Various modes of carrying out the invention are contemplated as being within the scope of the following claims particularly pointing out and distinctly claiming the subject matter which is regarded as the invention.

I claim:

1. Apparatus for rotatably indexing an element having a first face normally disposed in a desired position and a plurality of successive faces thereon and with said element having trunnions at each end thereof mounted for rotation in end brackets, said apparatus comprising, a shaft mounted in one of said brackets, a first gear mounted on said shaft, a second gear mounted on the adjacent trunnion and meshing with said first gear, a pair of spaced flanges mounted on said shaft, a plurality of circumferentially spaced pins carried between said flanges, a first piston mounted for sliding movement in a first cylinder disposed adjacent said shaft, said first piston having a recess disposed to receive a portion of said flanges, a pawl carried by said first piston and normally biased toward said shaft and having an end portion for engaging one of said pins, a second piston mounted for sliding movement in a second cylinder disposed adjacent said shaft, said second piston having a rack thereon which meshes with said first gear, hydraulic means for moving said first piston in said first cylinder so that the end of said pawl engages one of said pins to rotate said shaft and said element in one direction to present the next successive face of said plurality of successive faces at the said desired position, rotation of said shaft providing movement of said second piston by said rack, hydraulic means for returning said first piston to its initial position after each indexing step, and hydraulic means for returning the said second piston to its initial position to re-index said element in a reverse direction and return said first face to the said desired position.

2. Apparatus for rotatably indexing an element having a first face normally disposed in a desired position and a plurality of successive faces thereon and with said element having trunnions at each end thereof mounted for rotation in end brackets, said apparatus comprising, a shaft mounted in one of said brackets, a first gear mounted on said shaft, a second gear mounted on the adjacent trunnion and meshing with said first gear, a pair of spaced flanges mounted on said shaft, a plurality of circumferentially spaced pins carried between said flanges with the number of useable pins being one less than the total number of faces on said element, a first piston mounted for sliding movement in a first cylinder disposed adjacent said shaft, said first piston having a recess disposed to receive a portion of said flanges, a pawl carried by said first piston and normally biased toward said shaft and having an end portion for engaging one of said pins, a second piston mounted for sliding movement in a second cylinder disposed adjacent said shaft, said second piston having a rack thereon which meshes with said first gear, hydraulic means for moving said first piston in said first cylinder so that the end of said pawl engages one of said pins to rotate said shaft and said element in one direction to present the next successive face of said plurality of successive faces at the said desired position, rotation of said shaft providing movement of said second piston by said rack, hydraulic means for returning said first piston to its initial position after each indexing step, and hydraulic means for returning said second piston to its initial position from a position corresponding to an indexed position of the element where any of said plurality of successive faces is disposed at said desired position to re-index said element in a reverse direction and directly return said first face to the said desired position.

3. The apparatus of claim 2 which includes means for cushioning the return of said second piston to its initial position, comprising, an inner piston disposed for sliding movement within said second piston, said inner piston having a rod extending axially through the second piston and terminating outwardly thereof, a plug disposed in the second piston adjacent said inner piston with said plug having a bleeder opening therein, and an adjustable stop disposed in said second cylinder and disposed for engagement by said rod before the second piston reaches its initial position.

4. The apparatus of claim 2 which includes means engageable with one of the said trunnions for positively locking the said element in any indexed position, and hydraulic means for disengaging said locking means from said trunnion during indexing and re-indexing of said element.

5. Apparatus for selectively disposing the faces of a multi-faced element having a first face and a plurality of successive faces at a desired position, said element being mounted for rotation in end brackets; said apparatus comprising, a shaft mounted in one of said brackets, gear means connecting said element and said shaft, a plurality of drive members carried by said shaft with the number of useable drive members being one less than the total number of faces on said element, hydraulically actuated means for engaging one of said drive members to rotate said shaft and said element in one direction to present the next successive face of said plurality of successive faces at the said desired position, and hydraulically actuated means for moving said shaft in the reverse direction to directly return said element from the desired indexed position of any of said plurality of successive faces to said first face.

6. Indexing mechanism for a rotary element having a plurality of faces and having end trunnions mounted in bearings for free rotation of the element and having a cylindrical end portion, said mechanism comprising a separate locking recess for each face of the element and with said recess disposed on said cylindrical portion, a locking pin adapted to enter a locking recess to secure the element in indexed position, a pinion secured to one of said trunnions for indexing the element, a drive gear meshing with said pinion and having a plurality of ratchet pins spaced circumferentially thereof to provide successive step movements for indexing said element, a power cylinder disposed adjacent said drive gear, a piston operative in said cylinder, a latch pivotally carried by said piston and adapted to engage successive ratchet pins on said gear upon corresponding successive actuations of said piston in one direction in said cylinder for effecting successive indexing movements of said drive gear and adapted to pivotally retract past a pin when said piston is actuated in the opposite direction in said cylinder, a rack meshing with said drive gear, a second power cylinder with a piston therein secured to said rack, and means for actuating said last named piston to effect a return of said drive gear to starting position upon completion of a series of successive indexing movements of said element to return the latter to starting position.

7. Indexing mechanism for a rotary element having end trunnions mounted in bearings for free rotation of the element, said mechanism comprising a pinion secured to one of said trunnions for indexing the element, a drive gear meshing with said pinion and having a plurality of ratchet pins spaced circumferentially thereof to provide successive step movements for indexing said element, a power cylinder disposed adjacent said drive gear, a piston operative in said cylinder, a latch pivotally carried by said piston and adapted to engage successive ratchet pins on said gear upon corresponding successive actuations of said piston in one direction in said cylinder for effecting successive indexing movements of said drive gear and adapted to pivotally retract past a pin when said piston is actuated in the opposite direction in said cylinder, a rack meshing with said drive gear, a second power cylinder with a piston therein secured to said rack, and means for actuating said last named piston to effect a return of said drive gear to starting position upon completion of a series of successive indexing movements of said element to return the latter to starting position.

References Cited in the file of this patent

UNITED STATES PATENTS

| | | |
|---|---|---|
| 2,308,662 | Manteuffel | Jan. 19, 1943 |
| 2,498,284 | Leonard | Feb. 21, 1950 |
| 2,695,543 | Von Zelewsky | Nov. 30, 1954 |
| 2,713,283 | Lomazzo | July 19, 1955 |
| 2,720,129 | De Haas | Oct. 11, 1955 |
| 2,729,130 | Walker | Jan. 3, 1956 |
| 2,777,338 | Thompson | Jan. 15, 1957 |

FOREIGN PATENTS

| | | |
|---|---|---|
| 623,357 | Germany | Dec. 5, 1955 |
| 929,456 | Germany | June 27, 1955 |
| 930,358 | Germany | July 14, 1955 |
| 697,568 | Great Britain | Sept. 23, 1953 |